US009963912B2

(12) United States Patent
Carr et al.

(10) Patent No.: US 9,963,912 B2
(45) Date of Patent: May 8, 2018

(54) SELF-LOCKING DOOR AND PRODUCT DISPENSING ENCLOSURE HAVING A SELF-LOCKING DOOR

(71) Applicant: LIFE TECHNOLOGIES CORPORATION, Carlsbad, CA (US)

(72) Inventors: Thomas Daniel Carr, Encinitas, CA (US); Karen Spinks, Cardiff by the Sea, CA (US); Darren Thierry, Carlsbad, CA (US); Matt Willmon, Carlsbad, CA (US); Justin Curry, Vista, CA (US); Alex Kascoutas, San Marcos, CA (US)

(73) Assignee: LIFE TECHNOLOGIES CORPORATION, Carlsbad, CA (US)

( * ) Notice: Subject to any disclaimer, the term of this patent is extended or adjusted under 35 U.S.C. 154(b) by 0 days. days.

(21) Appl. No.: 14/651,790

(22) PCT Filed: Mar. 11, 2013

(86) PCT No.: PCT/US2013/030269
§ 371 (c)(1),
(2) Date: Jun. 12, 2015

(87) PCT Pub. No.: WO2014/092754
PCT Pub. Date: Jun. 19, 2014

(65) Prior Publication Data
US 2015/0322694 A1     Nov. 12, 2015

Related U.S. Application Data

(60) Provisional application No. 61/736,324, filed on Dec. 12, 2012.

(51) Int. Cl.
*E05B 47/00*     (2006.01)
*E05C 19/02*     (2006.01)
(Continued)

(52) U.S. Cl.
CPC ...... *E05B 47/0001* (2013.01); *E05B 47/0046* (2013.01); *E05C 19/02* (2013.01);
(Continued)

(58) Field of Classification Search
None
See application file for complete search history.

(56) References Cited

U.S. PATENT DOCUMENTS

| 5,886,634 A | 3/1999 | Muhme |
|---|---|---|
| 6,102,162 A | 8/2000 | Teicher |

(Continued)

FOREIGN PATENT DOCUMENTS

| DE | 101 64 574 | 4/2004 |
|---|---|---|
| DE | 10 2010 063477 | 6/2012 |

(Continued)

OTHER PUBLICATIONS

International Preliminary Report on Patentability for International Application No. PCT/US2013/030269 dated Jun. 16, 2015, 5 pages.

(Continued)

*Primary Examiner* — Leon-Viet Nguyen
(74) *Attorney, Agent, or Firm* — Life Technologies Corporation (57) ABSTRACT

Provided herein is an inventory management system for dispensing products from an enclosure, methods of securing products within the enclosure, use of the enclosure and for maintaining inventory. The inventory management system may include an enclosure having a self-locking door. The self locking door may include a door, a lock located on the door, a strike plate, wherein the strike plate controls the lock, and a sensor configured to detect the presence of a user and wherein the sensor controls the lock.

7 Claims, 6 Drawing Sheets

(51) Int. Cl.
  *G07C 9/00*     (2006.01)
  *G07F 17/12*    (2006.01)
  *G06Q 20/18*    (2012.01)
  *G06Q 20/32*    (2012.01)
  *G07F 7/08*     (2006.01)
  *G07F 7/10*     (2006.01)
  *G07F 9/02*     (2006.01)
  *G07F 11/00*    (2006.01)
  *G07F 11/02*    (2006.01)
  *G07F 9/10*     (2006.01)

(52) U.S. Cl.
  CPC ........... *G06Q 20/18* (2013.01); *G06Q 20/322* (2013.01); *G07C 9/00007* (2013.01); *G07C 9/00896* (2013.01); *G07C 9/00944* (2013.01); *G07F 7/0893* (2013.01); *G07F 7/10* (2013.01); *G07F 9/026* (2013.01); *G07F 9/10* (2013.01); *G07F 11/002* (2013.01); *G07F 11/005* (2013.01); *G07F 11/02* (2013.01); *G07F 17/12* (2013.01); *Y10T 70/7062* (2015.04)

(56) References Cited

U.S. PATENT DOCUMENTS

| | | |
|---|---|---|
| 6,116,461 A | 9/2000 | Broadfield et al. |
| 6,195,005 B1 | 2/2001 | Maloney |
| 6,204,763 B1 | 3/2001 | Sone |
| 6,318,138 B1* | 11/2001 | Mathews ............ E05B 47/0012 292/144 |
| 6,323,782 B1 | 11/2001 | Stephen et al. |
| 6,327,576 B1 | 12/2001 | Ogasawara |
| 6,366,205 B1 | 4/2002 | Sutphen |
| 6,609,969 B1 | 8/2003 | Luciano et al. |
| 6,677,857 B2 | 1/2004 | Bara et al. |
| 6,724,308 B2 | 4/2004 | Nicholson |
| 6,866,195 B2 | 3/2005 | Knowles et al. |
| 6,909,356 B2 | 6/2005 | Brown et al. |
| 6,989,741 B2 | 1/2006 | Kenny et al. |
| 7,015,811 B2 | 3/2006 | Decker et al. |
| 7,050,991 B2 | 5/2006 | Ogasawara |
| 7,088,248 B2 | 8/2006 | Forster |
| 7,119,692 B2 | 10/2006 | Lieffort et al. |
| 7,119,738 B2 | 10/2006 | Bridgelall et al. |
| 7,258,276 B2 | 8/2007 | Linton et al. |
| 7,293,705 B2 | 11/2007 | Linton et al. |
| 7,342,497 B2 | 3/2008 | Chung et al. |
| 7,348,884 B2 | 3/2008 | Higham |
| 7,474,217 B2 | 1/2009 | Himberger et al. |
| 7,474,281 B2 | 1/2009 | Lin et al. |
| 7,504,949 B1 | 3/2009 | Rouaix et al. |
| 7,661,591 B2 | 2/2010 | Dearing et al. |
| 7,675,421 B2 | 3/2010 | Higham |
| 7,696,874 B2 | 4/2010 | Stevens |
| 7,710,275 B2 | 5/2010 | Phillips et al. |
| 7,719,423 B2 | 5/2010 | Himberger et al. |
| 7,735,732 B2 | 6/2010 | Linton et al. |
| 7,791,479 B2 | 9/2010 | Dearing et al. |
| 7,812,719 B2 | 10/2010 | Djuric et al. |
| 7,911,346 B1 | 3/2011 | Claudatos et al. |
| 7,938,326 B2 | 5/2011 | Dearing et al. |
| 7,942,321 B2 | 5/2011 | Linton et al. |
| 7,967,199 B2 | 6/2011 | Linton et al. |
| 8,025,228 B2 | 9/2011 | Dearing et al. |
| 8,031,072 B2 | 10/2011 | Phillips et al. |
| 8,085,150 B2 | 12/2011 | Oberle |
| 8,102,264 B2 | 1/2012 | Rinkes et al. |
| 8,102,265 B1 | 1/2012 | Billman |
| 8,106,776 B2 | 1/2012 | Bauchot et al. |
| 8,106,778 B2 | 1/2012 | Killian et al. |
| 8,113,425 B2 | 2/2012 | Dearing et al. |
| 8,120,486 B2 | 2/2012 | Rinkes |
| 8,120,494 B1 | 2/2012 | Aiouaz et al. |
| 8,231,053 B2 | 7/2012 | Linton et al. |
| 8,258,961 B2 | 9/2012 | Phillips et al. |
| 2001/0042024 A1 | 11/2001 | Rogers |
| 2001/0054952 A1* | 12/2001 | Desai ................ E05B 77/48 340/5.72 |
| 2006/0116899 A1 | 6/2006 | Lax et al. |
| 2008/0115543 A1* | 5/2008 | Lanigan ............. E05B 47/0046 70/57.1 |
| 2009/0132090 A1 | 5/2009 | Kaczmarz et al. |
| 2011/0074543 A1* | 3/2011 | Kaczmarz ........... G06Q 10/087 340/5.73 |
| 2011/0080252 A1* | 4/2011 | Ibsies ................ E05B 41/00 340/3.1 |
| 2012/0200213 A1* | 8/2012 | Savage ............... E05B 1/0092 312/326 |

FOREIGN PATENT DOCUMENTS

| | | |
|---|---|---|
| EP | 1485775 | 12/2004 |
| EP | 1840854 | 10/2007 |
| GB | 2 429 987 | 3/2007 |
| WO | 05/47695 | 5/2005 |

OTHER PUBLICATIONS

International Search Report of the International Searching Authority and Written Opinion for International Application No. PCT/US2013/030269 dated Sep. 5, 2013, 9 pages.

* cited by examiner

SELF-LOCKING DOOR AND PRODUCT DISPENSING ENCLOSURE HAVING A SELF-LOCKING DOOR

CROSS-REFERENCE

This application claims priority to and the benefit of 61/736,324, filed on Dec. 12, 2012, entitled "Inventory Management System and Method of Use", which application is incorporated herein by reference in its entirety.

BACKGROUND

Currently radio frequency identification (RFID) technology is widely used for tracking products and for monitoring useful information regarding products. For example, information regarding product can be gathered from storage facilities, including restocking needs, inventory, tracking of products, or determining when reordering products is needed. Accurate inventory visibility is critical to optimizing business management processes and reducing unnecessary losses stemming from poor customer service and product availability. RFID is potentially the most powerful technology for managing inventory because of its ability to reduce the time it takes to perform inventory, thereby providing enterprises with real time visibility into the products on the shelves. In some cases, inventory tracking is accomplished using enclosures or otherwise protected areas enabled with RFID technology. These kinds of improvements in inventory time, allow RFID users to take immediate advantage to the inventory data and make real-time decisions on stock availability. Data gathered through real-time inventory is used not only to improve the customer experience and increase sales, but also to streamline operations and reduce overall costs. It would be advantageous to provide alternate systems and methods for such inventory management using RFID technology.

SUMMARY OF THE INVENTION

Provided herein is a self-locking door including a lock. The lock may be engaged using a switch located on a strike plate, wherein the switch controls the locking of the door. The switch may be located on the enclosure if the lock is on the door. Alternatively, the when the lock is on the enclosure or side-wall, the strike plate may be located on the door. Additionally, a sensor configured to detect the presence of a user may be located on the door. The lock may be engaged based on the state of the sensor. For example, the sensor may be a proximity sensor. In some embodiments, the door includes a computer coupled to the door, wherein the computer may be configured to control unlocking of the door. The lock may be configured to operate independent of the computer controlled unlocking, such that regardless of any signaling from the computer, the enclosure may lock on its own without input from the computer. For example, the computer could continuously send an unlock signal to the lock to keep the lock in an unlocked state, but such a signal may be overridden by the lock being in structural communication with the strike plate, with the switch of the strike plate, such as a magnetic switch, or by an indication of a person present sensor. In some embodiments, the strike plate may be a magnetic strike plate. In some embodiments the sensor may be selected from at least one of an ultrasonic sensor, a motion sensor, a proximity sensor, a pressure sensitive mat, a light curtain, and radar. In some embodiments, the lock may be an electrically-actuated lock.

Provided herein is a self-locking door comprising a lock comprising; a strike plate, wherein the strike plate controls the locking of the door; a sensor configured to detect the presence of a user; and a door. In some embodiments, the door comprises a computer coupled to the door, wherein the computer may be configured to control unlocking of the door. The door may be configured to operate independent of the computer controlled unlocking. In some embodiments, the strike plate may be a magnetic strike plate. In some embodiments, the sensor may be selected from at least one of an ultrasonic sensor, a motion sensor, a proximity sensor, a pressure sensitive mat, a light curtain, and radar. In some embodiments, the lock may be an electrically-actuated lock.

Further provided herein is a product dispensing enclosure comprising: a enclosure; a self-locking door coupled to the enclosure; a lock for locking the self-locking door, wherein the lock comprises a circuit, wherein the circuit controls the locking of the door; and a sensor for detecting the presence of a user, wherein the sensor is coupled to the lock. In some embodiments, the enclosure may be a cabinet. The cabinet may have at least three sides or may be a cylindrical cabinet. In some embodiments, the lock may be located on the door. Alternatively, the lock may be locked on the enclosure. In some embodiments, the enclosure of may further include a user authentication mechanism, such as for example, a badge reader. The badge reader is an RFID badge reader. In some embodiments, the enclosure may include a display screen. The display screen may be a touch display screen configured to provide at least one of access to the enclosure, displaying contents of the enclosure, or help functionality.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the invention are set forth with particularity in the appended claims. A better understanding of the features and advantages of the present invention will be obtained by reference to the following detailed description that sets forth illustrative embodiments, in which the principles of the invention are utilized, and the accompanying drawings of which:

DETAILED DESCRIPTION OF THE INVENTION

Provided herein is a self-locking door. The self-locking door may be on an enclosure or on a side wall of an area. The self-locking door may include a lock. The lock may be engaged using a strike plate, wherein the strike plate controls the locking of the door. In some embodiments, a switch may be located on the strike plate and it is the communication between the lock and the switch that controls the locking of the door. The switch may be a magnetic switch, optical switch, pressure switch or any combination thereof or any other suitable switch. The strike plate may be located on the enclosure if the lock is on the door. Alternatively, if the lock is located on the enclosure or side-wall, the strike plate may be located on the door. Additionally, a sensor, or person present sensor, configured to detect the presence of a user may be located on the door or in proximity to the enclosure. The lock may be engaged based on the state of the sensor. For example, the person present sensor may be a proximity sensor. In some embodiments, the door includes a computer coupled to the door, wherein the computer may be configured to control unlocking of the door. The lock may be configured to operate independent of the computer controlled unlocking, such that regardless of any signaling from the computer, the enclosure may lock on its own without input from the computer. For example, the computer could continuously send an unlock signal to the lock to keep the lock in an unlocked state, but such a signal may be overridden by the lock being in structural communication with the strike plate structure or by an indication of the sensor. In some embodiments, the strike plate may be a magnetic strike plate wherein a magnetic switch is located on the strike plate. In some embodiments the person present sensor may be selected from at least one of an ultrasonic sensor, a motion sensor, a proximity sensor, a pressure sensitive mat, a light curtain, and radar. In some embodiments, the lock may be an electrically-actuated lock.

Further provided herein is a product dispensing enclosure comprising: an enclosure, a self-locking door coupled to the enclosure, a lock for locking the self-locking door, and a sensor for detecting the presence of a user, wherein the sensor is coupled to the lock. In some embodiments, the enclosure may be a cabinet. The cabinet may have at least two, three, four, five or more sides or may be a cylindrical cabinet. In some embodiments, the lock may be located on the door. Alternatively, the lock may be located on the enclosure. In some embodiments, the enclosure of may further include a user authentication mechanism. The user authentication mechanism may be, for example purposes only, a badge reader including an antenna. The badge reader may be a RFID reader including an antenna for reading a RFID tag. In some embodiments, the enclosure may include a display screen. The display screen may be a touch display screen configured to provide at least one of access to the enclosure, displaying contents of the enclosure, or additional functionality.

Figure 1A:
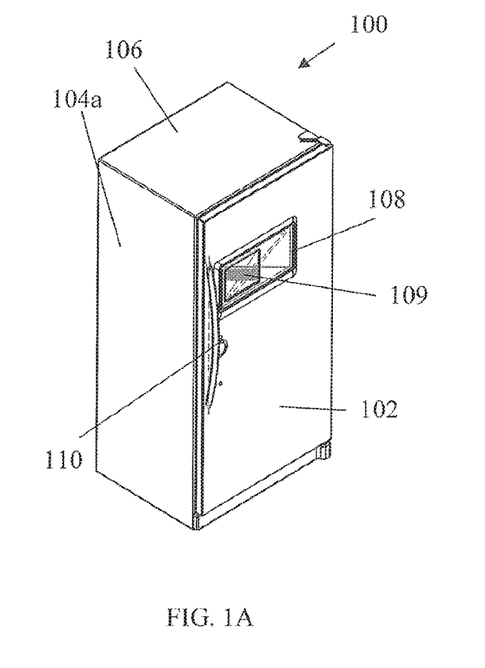
FIGS. 1A-1I show one embodiment of an enclosure.
Figure 1B:
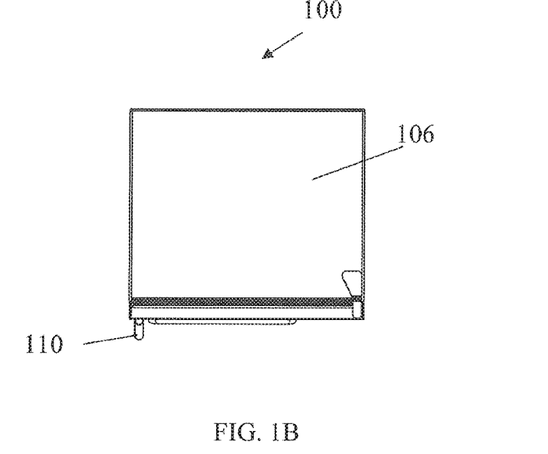
Figure 1C:
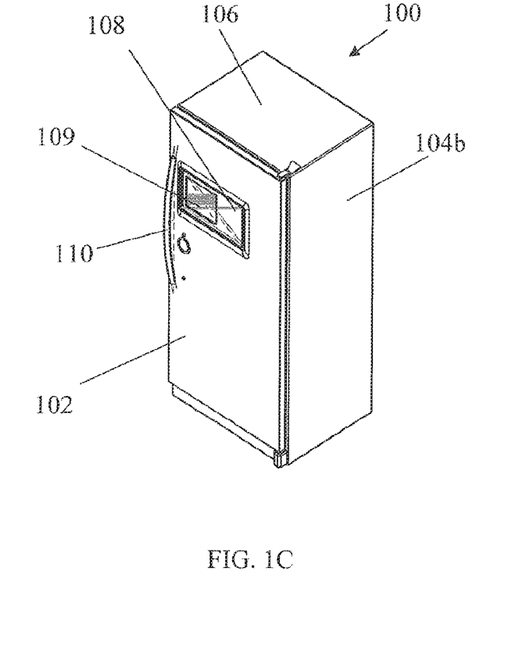
Figure 1D:
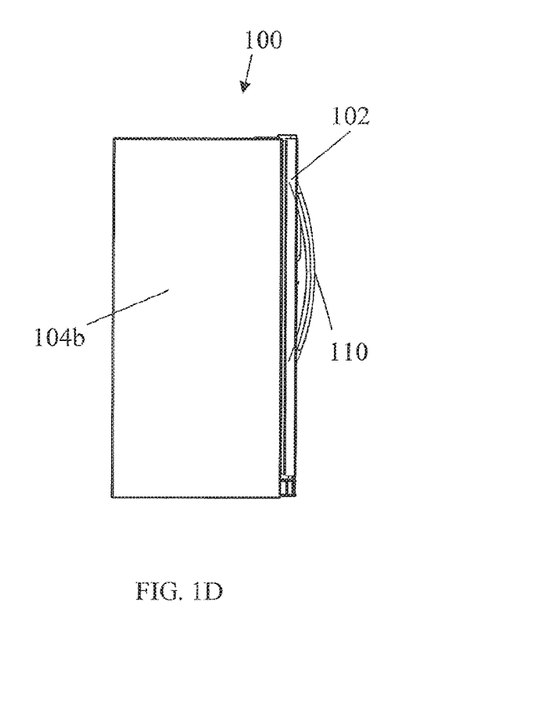
Figure 1E:
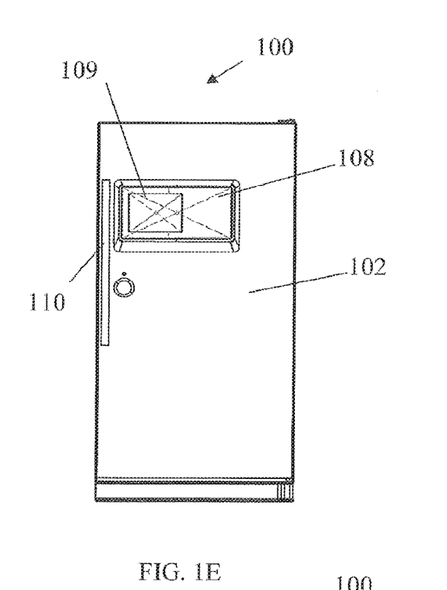
Figure 1F:
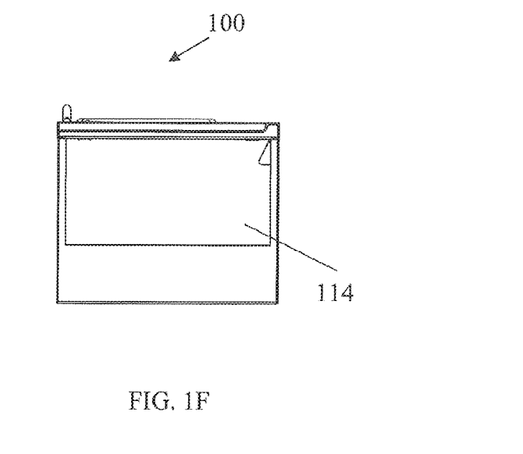
Figure 1G:
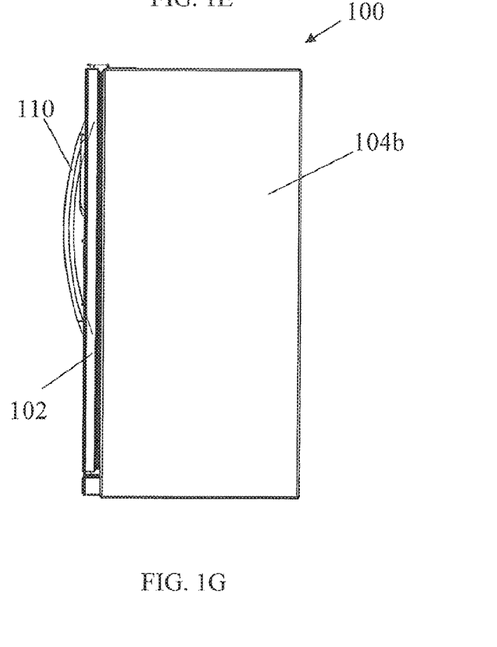
Figure 1H:
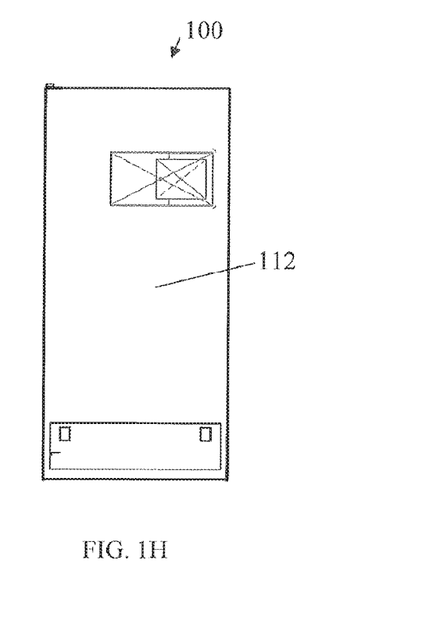
Figure 1I:
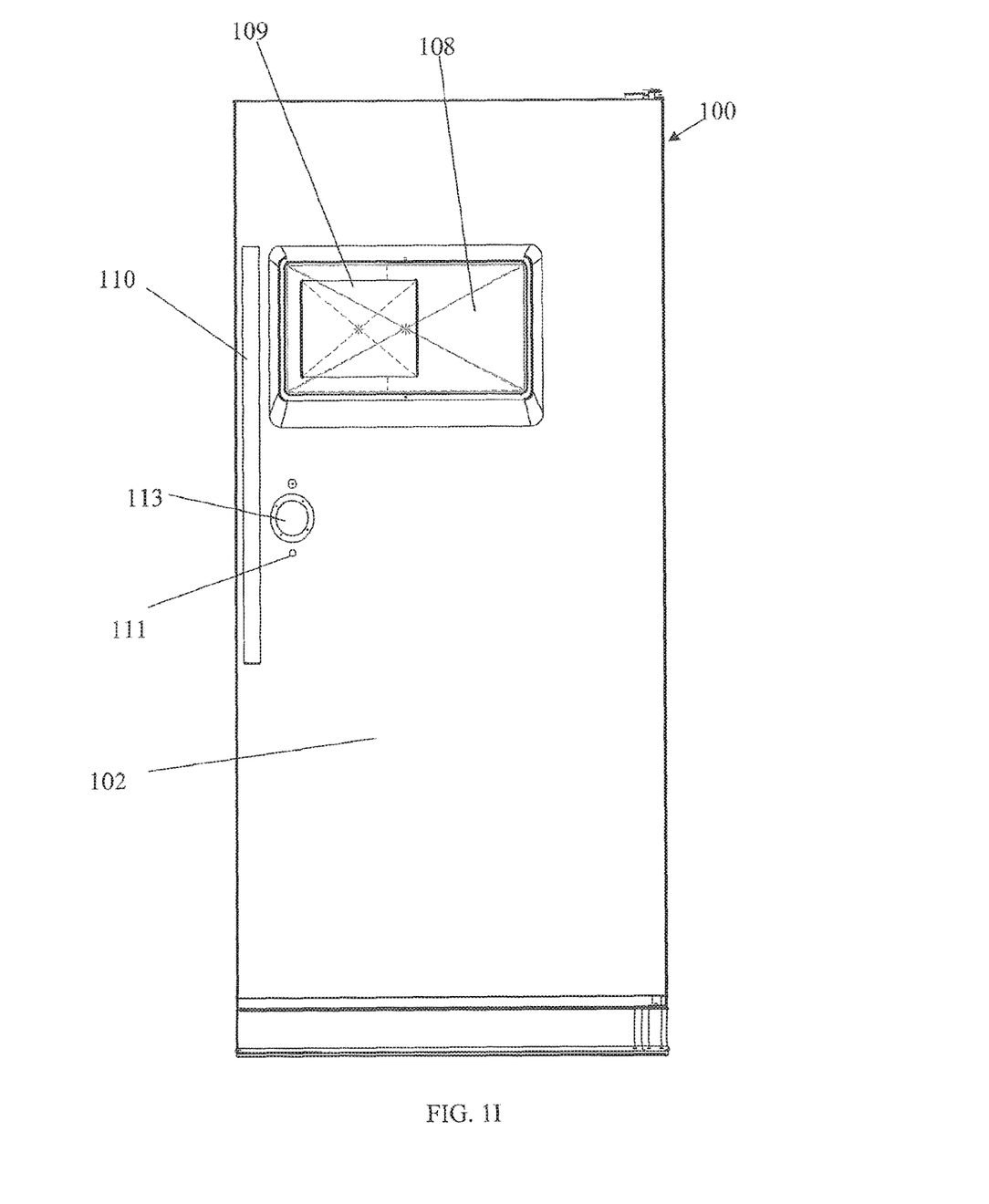

Further provided herein is an enclosure. In some embodiments, the enclosure may be used to store and/or dispense products. The enclosure may be a cabinet with four sides, a top, and a bottom. In some embodiments, the cabinet may be cylindrical. In some embodiments, at least one of the four sides, the top, or the bottom may be a door. In some embodiments, the enclosure is a refrigerator unit or a freezer. In some embodiments, there may be more than one door and there may be more than one lock. As shown in FIG. 1, in some embodiments, the enclosure may be a cabinet. FIG. 1A shows a perspective of the enclosure 100. In some embodiments, the enclosure 100 may have two sides 104a, 104b, a top 106, bottom, back side, and a door 102. In some embodiments, the door 102 may be a half door or a window. In some embodiments, the enclosure 100 may be cylindrical. In some embodiments, the enclosure may have a door and two sides. In some embodiments, the enclosure may have more than two sides, for example, three, four, five, or any other suitable number of sides. In some embodiments, the door may include a panel 108 with which the user may interact as may also include a graphical user interface 109. Additionally, a handle 110 may be included on the door 102 of the enclosure 100. FIG. 1B shows the top 106 of an enclosure 105. FIG. 1C shows a perspective view of the enclosure 100 form side 104b. FIG. 1D is a side view of the enclosure 100. FIG. 1E is a front view of the enclosure 102. FIG. 1F is a bottom view of the enclosure. FIG. 1G is a view of the enclosure 100 from the other side. FIG. 1I shows a view of the front door 102 of the enclosure 100. As seen in FIG. 1I, the door may include a panel 108. The panel 108 may have some functionality, including providing communication to an RFID reader located in the door 102 of the enclosure 100. Additionally, the panel 108 may include a touch pad, fingerprint reader, eye scanner, keyboard, or any other suitable authentication mechanism. Additionally, the panel 108 may include a screen 109, such as a GUI. The GUI may enable the user to interact with the cabinet, such as for example, by allowing the user to enter information through a touch screen. In some embodiments, the cabinet may include manual lock that is hidden behind a cover 113. In some embodiments, an authorized administrator may be able to access by manual lock by removing or moving the lock cover 113. In some embodiments, the door 102 may also include a proximity sensor 111.

In some embodiments, the enclosure may be used to store products. The products may be tagged with electronic tags, for example, RFID tags, magnetic tags, or any other suitable tag. The products may be inventoried manually by personnel maintaining the enclosure. In some embodiments, the products may be inventoried by the enclosure itself. In such an embodiment, the enclosure may be equipped with an antenna for detecting an electric signal from a tag on a product. In some embodiments, there may be more than one antenna. In some embodiment, the antenna may be located in the interior of the enclosure. Alternatively, the antenna may be located within the door, such that it isn't directly exposed to the interior of the enclosure and to the interior conditions of the enclosure.

In some cases, products may be inventoried. The products may be inventoried using a tag associated with the product. In some embodiments, the product may be tagged with a bar code. In some embodiments, an electronic or magnetic tag may be associated with a product. In some cases, the electronic tag is an RFID tag. The tag may be located on the product itself. To inventory the product, in some embodiments, all tags can be scanned or activated or pinged by the antenna. Once a product is removed, the product will no longer be scanned. In some embodiments, the tag may be located on a shelf. In some embodiments, the tags may be shielded, and only exposed tags may be scanned. For example, the product may be tagged and placed on a metal shelf or some other material which blocks the tag from being read. Once the product is picked up, the antenna can then scan the tag associated with a product and determine which product is being removed from the cabinet. In some embodiments, the tag is located on the shelf but the tag is shielded by the product. Once the product is removed from the shelf, the tag is then exposed and can be scanned to inventory the item removed.

Further provided herein are alternate mechanisms for operating the enclosure. In some embodiments, the enclosure may have a door. In some embodiments, the enclosure may have two doors or more than two doors. The two doors may provide two separate access paths to the interior of the enclosure. In some embodiments, the second door can be used to view the interior of the cabinet without accessing the interior of the enclosure. In some embodiments, where the enclosure is a refrigerator or a freezer, the second door may serve to save energy by maintaining the temperature of the enclosure. The second door may have a defrosting mechanism to prevent frost build up or fog. In some embodiments, the second door may be locked. In some embodiments, the viewing door may be opened when access is granted, for example on authentication of a valid user. In such an embodiment, a user would approach the enclosure. The user may decide to preview the contents of the enclosure by opening the outer door. The user may open the outer door and view the contents of the enclosure. If the user decides to obtain something from the enclosure, the user would then shut the outer door and authenticate with the enclosure using, for example, a badge or typing in a key code, so that the outer door engages with the inner door. The outer door may then enable the user to open the door. The inner door may or may not be unlocked. If the inner door is unlocked, it may still be difficult to open. For example, the inner door may be held in place with magnets but there may not be an easy way to open the inner door. Once the inner and outer doors are operable as a single unit, the opening of the outer door may facilitate the opening of the inner door. In some embodiments, the inner door is locked and unlocks with when the user authenticates and the outer door unlocks the inner door.

In some embodiments, the enclosure may be opened using a hidden handle. In such an embodiment, a handle or other means for manually opening the enclosure door is rendered inaccessible until a user is authenticated by means of a unique identifier such as an RFID card, magnetic stripe card, biometric ID, or the like. Once authentication has taken place the user is given access to the handle or other means for manually opening the enclosure. Since the door is never locked, it is critical that the outside covering of the enclosure provide no features that a user could grasp and use to open the door when the handle is hidden or inaccessible. In some embodiments, the hidden handle embodiment of the enclosure may not include any physical features on the exterior of the enclosure that can be used to manually open the enclosure door when the handle is in a hidden state. In some embodiments of the hidden handle embodiment and in some embodiments of any of the concepts provided herein, an alternate mechanism by which the enclosure may be opened is present. For example, a manual release lever or switch may be present somewhere on the enclosure. Once the user has finished at the enclosure, the handle may be hidden automatically. Alternatively, the user may indicate to the enclosure that the user no longer needs to access the enclosure, and the handle may be hidden once that indication has been made.

In some embodiments, the door itself has no handle. Located within the vicinity of the enclosure may be a handle dispenser. In such an embodiment, the user would provide some kind of code or authentication mechanism to the handle dispenser indicating that the user is an authorized user. The handle dispenser would then dispense the handle. The user would then attach the handle to the door by some mechanism, for example, by suction or magnets or a mechanical structure for attaching the handle to the door. Whatever attachment mechanism is used, the attachment of the handle may be reversible. The handle would then provide the user with a method of opening the door. In some embodiments the door can be locked and the handle can include a key slot for unlocking the door. Alternately the handle can include a key pad or other mechanism for entering a code. The handle could then communicate with a locking mechanism wirelessly. Once the user is done, the user would then disengage the handle from the enclosure and return the handle to the handle dispenser. In some embodiments, returning the handle to the dispenser would complete a transaction and permit the cabinet to inventory product.

In some embodiments, the cabinet may have openings that allow a user to reach in physical grasp the product that they are interested. In some embodiments, the user can remove the product through the openings. In some embodiments, the user can manipulate the product to a second door or opening through which the product can be removed. In some embodiments, the gating feature which would allow the user to grab a product may be locked in that a hand could not be inserted through the opening. In some embodiments, the exit door could be locked. In such an embodiment, the user may have to authenticate in order to gain access to the interior of the cabinet.

In some embodiments, the door may include a programmable lock. In some embodiments, the programmable lock is interfaced with a computer wherein the computer controls the code needed to be entered to the lock to enable unlocking. In some embodiments, a user may authenticate with the enclosure or may, alternatively, log in to an online portal. In order to access the enclosure, at some point during a transaction, either the online portal or enclosure itself may display a randomly generated code sequence. When the user is ready to access the enclosure, the user may then take the code sequence and enter the code into the lock to unlock the cabinet. With each usage, the computer may change the code so that no two sequential codes are the same.

In some embodiments, the enclosure may be locked. The cabinet may be locked using a key lock. In some embodiments a user would be given a key for use with the enclosure. In such an embodiment, an electronic tag, such as an RFID tag, may be affixed to or embedded on the key. In such an embodiment, a detector located in proximity to the enclosure would be able to read the tag and thereby identify the user. In some embodiments, the tag may be associated to a default user account. In some embodiments, the enclosure may be locked with an electronic locking system that may be unlocked using a computer in communication with a key pad, key code, electronic badge reader, or any other suitable mechanism for allowing a user to change account information, profile information, or any other suitable information.

In some embodiments, the cabinet may remain unlocked. In such an embodiment, the cabinet may be equipped with an alarm. In such an embodiment, if an unauthorized used opens the cabinet without authenticating, an alarm will sound. The alarm would be deactivated when the door is closed. In some embodiments, an alarm can sound if the door is left open.

In some embodiments, the door may be lockable. The door may be locked and unlocked using a manual key. In some embodiments, the door may be locked and unlocked using a computer. In such an embodiment, the door may be unlocked after a user presents a key code, RFID badge, magnetic swipe card, credit card, fingerprint, retinal scan, or any other suitable mechanism for unlocking the door. In such an embodiment, if an authorized user has presented a suitable mechanism for unlocking the door, the computer may then control the unlocking of the locked door. In some embodiments, a code can be entered to unlock the door. In some embodiments, this code can remain the same. In some embodiments, the code can be a randomly generated number that changes each time a user authenticates such that the same number may not be used twice in a row.

In some embodiments, the computer controls the locking of the door. In some embodiments, the door locks independently from the computer and is therefore not controlled by the computer. In some embodiments, the lock can work on a fixed delay. In such an embodiment, the computer may send an unlock command to the door lock to unlock the door. At such time, a timer can be initiated by this unlock command so that the lock engages after a fixed time period if the door is not opened. In some embodiments, the lock can engage without using a fixed delay. If the door is opened before the fixed time period expires, then the timer may be ignored and the lock may remain in an unlocked state until the door is closed. In some embodiments, the timer holds the lock in the open position, however, once the door is closed a strike plate may force the lock to engage regardless of the door is closed. In some embodiments, the presence of the user is sensed by a sensor on the enclosure during the time interval between when the computer sends the unlock command and the user opens the door. A proximity sensor could be used to sense the presence of the user and hold the lock open until the door is opened. In such an embodiment, if the user walks away without opening the door, the lock engages based on the state of the proximity sensor. In some embodiments, the enclosure may be positioned on a weight sensor pad or a weight sensor pad may be placed in front of the enclosure. The weight sensor pad may sense whether someone is present in front of the enclosure based on weight. Once the user leaves the weight pad, the sensor notes the absence of the user and causes the lock to engage.

Figure 2:
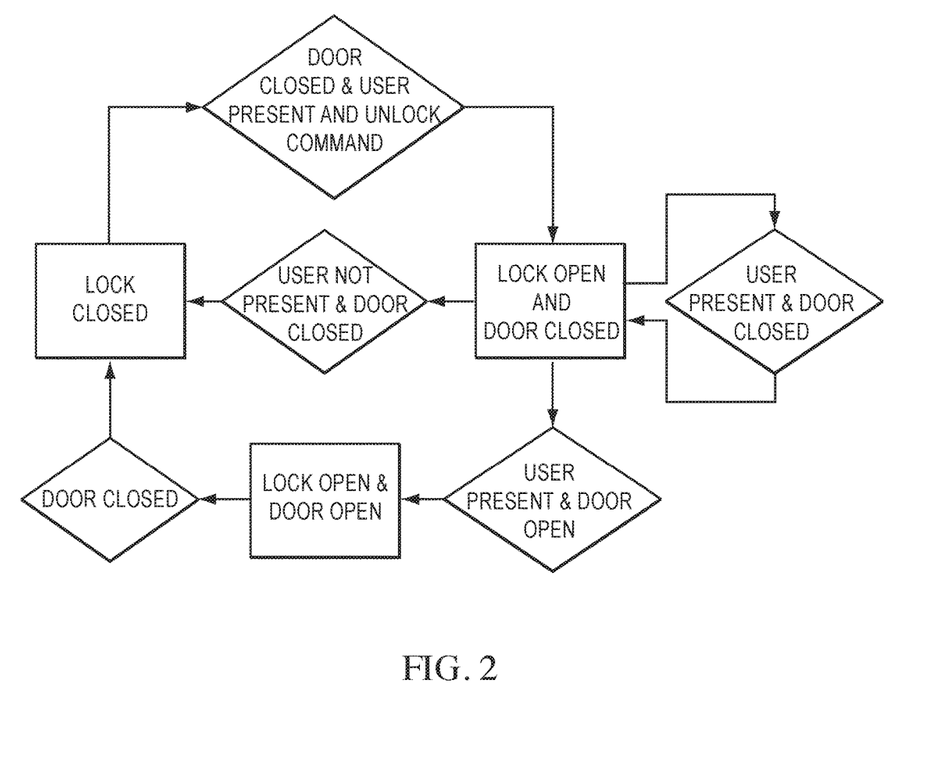
FIG. 2 shows a flow chart of the states of an enclosure.

A state flow chart is shown in FIG. 2. In some embodiments, the enclosure may have three states. The first state may be a locked closed stage. In such an embodiment, the door to the enclosure or cabinet is closed and the lock is engaged such that the door cannot be opened. The second state of the cabinet is the lock open but door is closed state. In this state, the computer has issued a command to unlock the door but the door is never opened. A mechanism or circuit in the lock may keep the lock in the opened state. Additionally, a state input may be provided to the lock which input may indicate that the user is at the enclosure, thereby maintaining the lock in an open state. For example, the presence of a user detected by a proximity sensor may send a unlock signal state. The last state of the enclosure is the lock is in an open state and the door has been opened. In this state the user has opened the door. Therefore, a different mechanism may be used to maintain the unlocked state.

In some embodiments, the cabinet or enclosure may include an electrically-actuated deadbolt lock with a magnetic switch or release mechanism. As long as the requisite voltage is applied to the actuator input the deadbolt is kept in the withdrawn position, unlocking the door. If the voltage is removed while the door is in the closed position, a magnet in the strike plate releases the deadbolt and the door locks. If the door is opened and the voltage subsequently removed, the deadbolt remains in the withdrawn position until the lock mechanism sees the magnet in the strike plate when the door is closed again. Therefore, the lock remains completely independent from computer control.

Figure 3A:
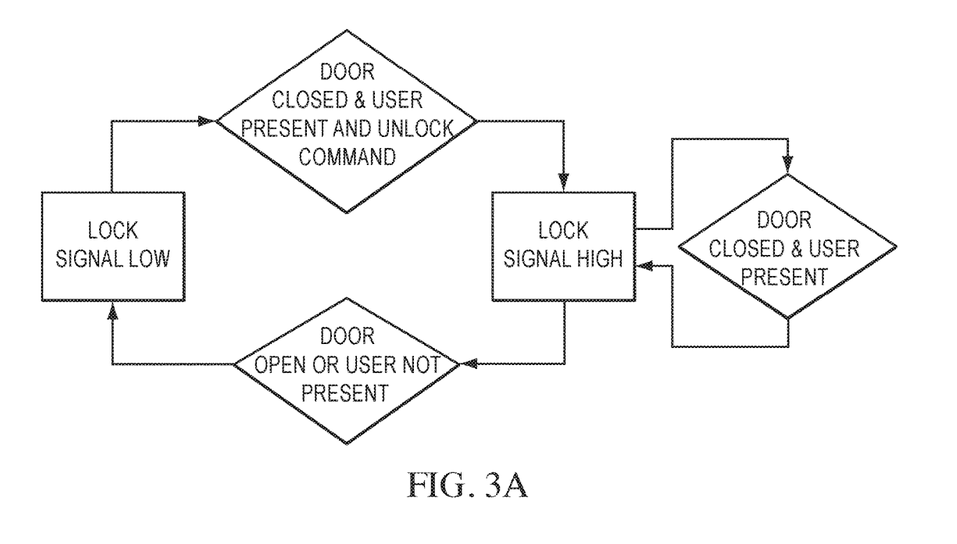
FIG. 3A shows a flow chart of the state of an enclosure.
Figure 3B:
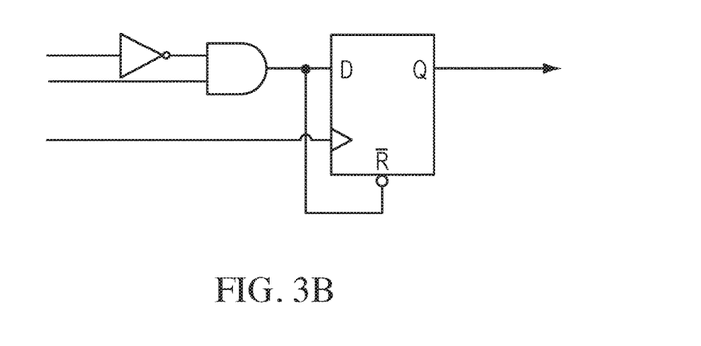
FIG. 3B shows a circuit for controlling the enclosure.

In some embodiments, a user approaches an enclosure. The detection of the presence of the user by the detector makes the output of the detector go high. If the enclosure door is closed, the door open signal will be low, the output of the inverter will be high, and the output of the AND gate will be high. When an unlock command is sent from the computer, the high output of the AND gate will be clocked into the flip-flop resulting in voltage being delivered to the lock mechanics which then retracts the dead bolt, unlocking the enclosure. If either the door is opened or the user present detector senses that the user is no longer near the enclosure, the output of the AND gate goes low, resetting the flip-flop which turns off the voltage to the lock mechanics. A flow chart for this is shown in FIG. 3A and a schematic circuit for this approach is shown in FIG. 3B.

In some embodiments of the enclosure, a user present detector is present. The user present detector may be, for example: ultrasonic sensors, SONAR sensors, PIR motion sensors, IR proximity sensors, pressure-sensitive mat, light curtains, RADAR, or any other suitable sensor for detecting the presence of a user. In some embodiments, the sensor may be inexpensive, have a low integration cost, may be transparent to the user, may sense the presence of a user in a defined area, have a detection area that may be programmable, have no external (to the enclosure) wiring, or have any other suitable characteristics.

Figure 4A:
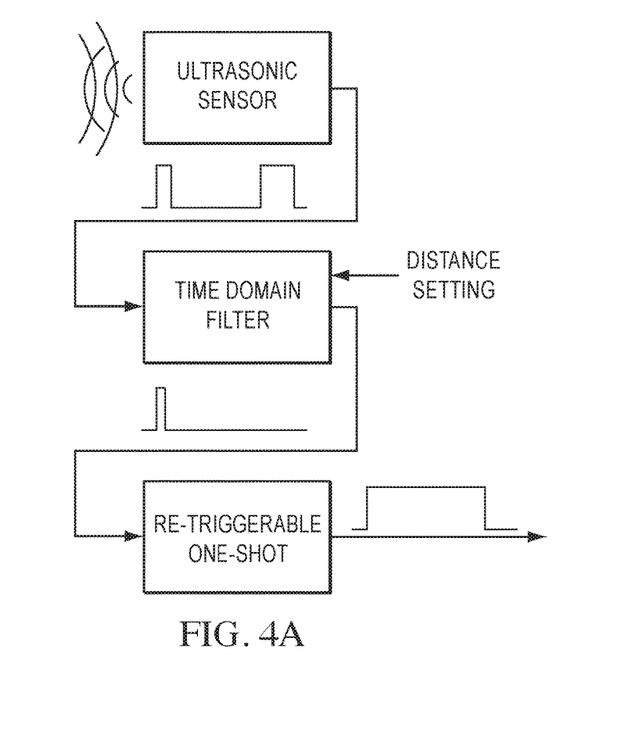
FIGS. 4A & 4B show an embodiment of the enclosure operation.
Figure 4B:
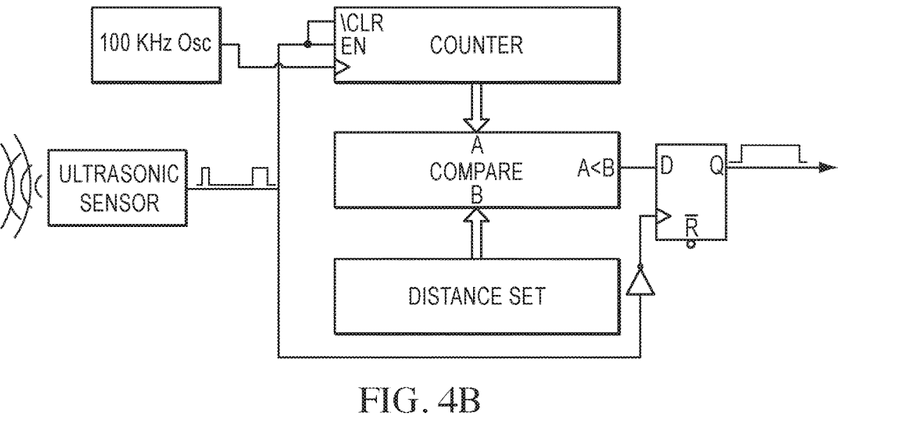

In some embodiments, an ultrasonic sensor may be used. The ultrasonic sensor may transmit a short burst of ultrasonic sound and measure the time it takes to receive back an echo. In some embodiments, the sensor may have a freerunning mode in which a pulse is output from the sensor on a regular basis, for example every one (1) second. In such an embodiment, the width of the pulse corresponds to the distance from the sensor to the first detectable object. The wider the pulse the farther the first detectable object was from the sensor. Furthermore, in such an embodiment, a circuit is needed that outputs a high signal for as long as pulses with duration of less than a set value are received from the ultrasonic sensor. Thus a "person present" signal is sensed whenever someone is within the set distance to the sensor. Block diagrams of two implementations of such a circuit are shown in FIGS. 4A & 4B.

Further provided here is a method of triggering door re-lock. In some embodiments, a computer may control the unlocking of the door. Once the door is unlocked the door may then remain unlocked regardless of any input from the computer. The user may either open the door or the user may not open the door. If the opens the door, the door only relocks upon the door being closed. This is due to the lock sensing the strike plate. In some embodiments, the lock and strike plate control the locking of the door. In some embodiments, the strike plate and lock complete a circuit which allows the lock to lock. In some embodiments, there is an optical connection between the lock and strike plate, or any other suitable mechanism the lock identifying the strike plate, thereby engaging the lock for locking of the door using the strike plate and the lock.

In some embodiments, the user does not open the door. In such an embodiment a user inactivity timer may start. In such an embodiments, the system may time out and/or go into a home state whether or not a person or user is present. In some embodiments, the time out state may include relocking of the door. Alternately, the time out state is independent and does not affect the locking of the door. When a user is present but the user does not open the door, the system may time out and a home screen may be presented. When the user authenticates at the door, the door may unlock and the user may then open the door, since it is in an unlocked state. The user who initially authenticated may then be charged for any items identified as taken. However, if the person who authenticated walks away, the lock is then notified that the user is no longer present and locks the door, even though the enclosure and any processing system may not recognize that the person is no longer present. Only when a new user authenticates at the enclosure, does the processing system of the enclosure restart. Once the system has restarted, the system may accurately associate any taken products with the correct user. In some embodiments, a user may exit the proximity sensor zone.

Once the user exits the proximity zone, the door then locks. Locking of the door may occur regardless of whether or not the system times out.

Further provided herein is an inventory management system and enclosure that may or may not provide real time inventory management or order tracking using RFID tags. The inventory and order tracking may be automated. Furthermore, in some embodiments, the system may include remote and/or web based inventory monitoring capabilities. In some embodiments, the enclosure of the inventory management system may include an access mechanism whereby a user may use an issued unique identifier, such as a badge reader for use with a swipe badge for unlocking the door, to access the enclosure and allow the enclosure in conjunction with a server, to track usage. Additionally, the enclosure may enable unlocking of the door using a user name and/or password. After an item or items is/are removed from the enclosure, the user will then close the door. In some embodiments, a print out of the items taken may either displayed on the screen with the option of a receipt being printed at the enclosure. Alternatively, the summary of the items taken may be emailed to the user.

In some embodiments, the enclosure may be a smart enclosure. The enclosure may be enabled to recognize a tag on a product the user has removed from the cabinet and to identify the actual product based on the tag. The system or enclosure may then display technical information about the product, including the size of the product, price, information about the product, product recommendations that the user may want to consider that are compatible with the product, recommendations against products that do not work as well with the product, promotions, advertisements, or any other suitable product information.

In some embodiments, a user may be registered with an inventory manager or the administrator of the enclosure, or both. The user may be an entity such as a company, with multiple persons authorized to access the enclosure on behalf of the company. In such an embodiment, each person associated with the entity may be given a unique badge ID or other access unique identifier access mechanism, such as a fingerprint, retinal scan, key, swipe card, barcode, or any other suitable mechanism for accessing the enclosure, which unique identifier may be used to track usage by personnel, product taken by a specific personnel, frequency of accessing the enclosure by the personnel, or any other suitable reason for tracking which user accesses the enclosure. Alternatively, each user may be given an accessing mechanism but the mechanism may not be unique to each individual, such that the enclosure may not determine which personnel is accessing the enclosure. In some embodiments, multiple entities, such as multiple labs at a research institution, at a given location may register with the inventory manager and/or the administrator.

In some embodiments, an enclosure administrator responsible for the enclosure is on site. The user may then either pick up a badge from the administrator or the administrator may deliver a badge to the user. In some embodiments, a badge may be mailed to the user. In some embodiments, the enclosure may include badges or other user issued cards. Upon logging into an enclosure for the first time, the GUI may then instruct the user how to have the badge associated with the user. In some embodiments, the user may associate the access badge to an account online through an online portal provided by the inventory manager or related entity. In some embodiments, the stocked badges in the enclosures have SKU numbers associated with them by which the inventory management system can keep track of the number of badges in the enclosure. In such an embodiment, the enclosure may determine if the number of badges is low and may automatically send a replenishment order for badges. In some embodiments, the online portal may be used to manage an account profile, including cost centers or payment options, activation of access badges obtained from an enclosure, or any other suitable action to be done through a portal.

In some embodiments, the method of registering a user may include a user providing information to the inventory manager and/or administrator. For example, in some embodiments, a user may provide a cost center to the inventory manager. In some embodiments, the user may provide a funding source, such as a government or institution awarded grant. In some embodiments, a user may be able to register multiple sources of funding, the source to be selected during checkout or prior to entering the enclosure or at a suitable time. Additionally, the user may select a default source of funding. In some embodiments, the user may provide or may be required to provide a credit card as a primary source of payment or a back-up source for payment. In some embodiments, providing credit card information may be optional.

By registering a user, the enclosure may be used for purposes. In some embodiment, the enclosure may track usage, popular items, temperature of the unit, lot and expiration date of a product, cycling of the motor controlling the temperature of the unit, or any other parameter suitable for tracking. In some embodiments, the enclosure may accept feedback by a customer.

In some embodiments, a separate administrator tool or login will be available through the portal. In such an embodiment, an administrator may log into the supply center by clicking on an administrator link. In such an embodiment, additional functionality may be available to the administrator such as for example, usage reports, product tracking reports, or any other suitable custom report where information collected by the enclosure may be disseminated. In some embodiments, a specific enclosure may be selected through the administrator tool. In such an embodiment, remote management of stock may be possible.

In some embodiments, the enclosure may be provided with a graphical user interface (GUI). The GUI may be a touch screen interface. Alternatively a user may interact with a monitor located on the enclosure using a keyboard. In some embodiments, a user may check through the GUI the contents of the cabinet. The contents may be divided by product categories, product names, or by catalog number. In some embodiments, the user may input a selected genetic sequence or other biological identifier and a list of relevant products may be presented to the user. In some embodiments, the GUI may highlight or promote specific products, or new products. In some embodiments, the GUI may indicate to the user the inventory levels located in the enclosure. Additionally, the GUI may indicate any nearby enclosure which may have products not available at the enclosure the user is interacting with.

Provided herein is a GUI for use with an enclosure. In some embodiments, a login screen may be present either continuously or when the system comes out of a standby mode. In some embodiment, the user may authenticate at the login screen by either registering as a first time user, using a first time user or equivalent functionality (which may be through a button located on the GUI, for example) or the user may access the enclosure without using a badge using the access without badge functionality. Additionally, an option may be provided on the welcome screen that may provide the users with more options related to the inventory or to the enclosure and may facilitate the user interacting with a service representative of the enclosure. Additionally, before authenticating at the enclosure, the user may wish to determine whether a product is present by using an enclosure inventory functionality. Once the user presses the enclosure inventory functionality, an inventory screen may appear detailing the inventory of the enclosure. The inventory screen may include information such as whether a product is new, which product category is being viewed, product name, price, catalog number, size of product, and how many units are present in the enclosure. Additionally, in some embodiments, an item that is needed may not be listed in the inventory screen. In such an embodiment, the user may use the stock request or non-stock item ordering functionality, to submit a request for an item to be stocked in the enclosure. The stock request may be sent directly to the account representative of other administrator of the enclosure In some embodiments, the GUI may provide a help feature to the user. For example, the GUI may provide a walk through for a first time user. Additionally, the GUI may provide stock requests or options to request products without specifically opening the enclosure or without authentication. In some embodiments, the enclosure may be equipped to handle returns. In such an embodiment, information about product returns may be present as part of the help feature. In some embodiments, information on how to use or access the enclosure may be available through the help feature. In some embodiments, the contact information for the local administrator or the inventory manager may be available through the help feature. For example, the account representative for the enclosure may be listed. Additionally, a contact number and/or email may be presented on the help screen. In some embodiments, the user may contact the account representative directly through the enclosure, through a either a built in phone, or email portal.

In some embodiments, the available contents of an enclosure may be viewable through a website. In such an embodiment, a user may be able to log into the inventory management portal for a specific enclosure or for all enclosures at a specific location. In some embodiments, the inventory of an enclosure may be updated in real-time. Through the online portal, the user may be able to view inventory, see the order history for the user or for a lab to which the user is associated. Additionally, the user may be able to manage account profiles either through the portal or through the enclosure itself, including activating additional badges for a group, entering new cost center information, or other payment information. In some embodiments, the portal may provide access to the enclosure. In some embodiments, the portal may provide access to a product catalog through which a user may request additional products. The user may navigate through an online version of the catalog to view products and request services. Additionally, the user may interact with the portal in such manner as to have the portal suggest products to the user and additionally, in some embodiments, the portal will indicate where, locally, the products are located. For example, the user may be able to input some information into the portal, such as gene, sequence, experiment, protocol or any other suitable useful data, and the portal may suggest products that the user may be interested in purchasing.

In some embodiments, the enclosure may be accessible to an administrator through an administrator portal. In such an embodiment, the administrator may be able to determine usage of specific enclosures, run reports, check enclosure health, and identify problems associated with the enclosures. Additionally, the administrator may be able to monitor product levels and ensure replenishment order have been placed and further may track replenishment orders.

A user desiring to obtain a product from the enclosure may attempt to access the enclosure using a unique identifier as previously described above. In some embodiments, a user may input a credit card number or a purchase order number for a one time use of the enclosure. Once a user has authenticated to the enclosure that the user is an authorized user, the GUI may then provide the user with payment options. In some embodiments, a user account may be created. The user account may associate with the user cost centers, department information, or research and/or grant information out of which to pay for items removed from the enclosure. In some embodiments, where a user does not identify a payment option, a default account may be used. In some embodiments, a user may use a smart phone, tablet, mobile website, app, or any other suitable portable device or web-based application in internet communication with the enclosure to gain access to the enclosure. For example, a user may have an app on a smart phone that they can log into and view the contents of the enclosure. In some embodiments, the user may then exit the mobile app and login at the enclosure itself, using either a registered badge or a user name and password. In some embodiments, the user may use the app to unlock the enclosure after the user has been identified and authorized, In such an embodiment, the user may be able to gain access to the enclosure without having a badge, by having an individual in a remote location authenticate at the remote location thereby unlocking the door.

Once the payment method has been identified, the enclosure, if locked may be unlocked and the user may open the door. In some cases, the GUI will indicate to the user that the enclosure is accessible. In some embodiments, a suitable indicator, such as a green light, will indicate to the user that the enclosure is accessible. In some embodiments, a user may scan an access badge somewhere in the vicinity of the GUI in order to authenticate as a user. In some embodiments, the badge scanning area maybe adjacent to the GUI. In some embodiments, the badge scanning area may be near the door handle or on the door handle, or in any suitable location on the front of the enclosure. Once the user has authenticated using an access badge, or alternatively using a manual login and password, a payment screen may appear. In some embodiments, the enclosure may unlock without a payment screen. In some embodiments where a payment screen is present, the payment screen may identify the user name. In some embodiments, the payment screen may allow the user to select and/or view payment information such as payment method, cost center, billing account. The user may also be able to select an account associated with the user such as, for example, a purchase order (PO) number by selecting the PO number functionality. In some embodiments, the user may select additional information by selecting a secondary functionality, such as a PO reference number functionality. For example, the user may be able to select a default PO number, select from multiple POs, or input order-specific values. The user may also have the option of cancelling any access to the enclosure using a cancel functionality or the equivalent. In some embodiments, the cost center functionality may provide for a separate interface in which additional tracking information of the user may be captured, such as department, grant funding source, or an institution cost center. In some embodiments, a billing account summary screen may be provided to the user, in order to summarize the payment information for the user. In some embodiments, a separate payment summary window may allow the user to check that the payment method is the correct payment method. Once the user has determined that the payment method is correct, an access functionality, door open functionality, confirmation functionality or any suitable functionality for indicating the user is ready to access the contents of the enclosure may be used. Alternatively, if the user needs to make changes, a functionality which would take the user back to the payment screen may be used. The user can also cancel the transaction using the cancel functionality, or similar. Once the access functionality has been pressed, a door open screen may be presented to the user to indicate the enclosure has been unlocked. In some embodiments where a single default payment method is on record, the GUI would immediately default to the access screen.

Provided herein is an inventory management system. In some embodiments, a user authenticates at an enclosure. The enclosure may house products. The enclosure may be refrigerated or non-refrigerated. Once a user has obtained something, such as a product, from the enclosure, an order may be placed from the enclosure. In some embodiments, the enclosure is in communication with a management system. The enclosure may be in communication with the enclosure through a wired or wireless transmission mechanism. In some embodiments, the enclosure is connected to the internet. In such an embodiment, the enclosure may communicate to the inventory management system (IMS). The IMS may be monitored by an inventory manager. The inventory manager may receive the replenishment request. In addition to receiving the replenishment request the IMS may be used to indicate to a user through the enclosure, itself, items that are stocked or available through a catalog. In addition the IMS may be used to report and track usage or enclosure health. The reporting may be done to an administrator of the enclosure or may be done to the inventory manager. Enclosure health may include temperature sensing, settings of a compressor for cooling an enclosure, product shelf life. In addition the IMS may be used to generate a user database for an enclosure or a location. Once the replenishment request has been processed, items to replenish the enclosure may then be shipped to the location of the enclosure. Once received at the location the administrator of the enclosure may then restock the enclosure. In some embodiments, a location may have a single enclosure. In some embodiments, an enclosure may have multiple enclosures. In some embodiments a user may have access to all enclosures at a specific location. Alternatively, a user may have access to only one or some of the enclosures at a location. An administrator of the enclosure may be provided with a universal access mechanism which would allow the administrator to access whichever enclosure needed to be serviced or accessed.

In some embodiments, provided herein is an inventory scanning system. In some embodiments, the enclosure may scan the items inside the cabinet for inventory purposes. In some embodiments, the enclosure may scan the items when the door is open. In some embodiments, the door may scan the items when the door is closed. In some embodiments, the door may scan the items upon sensing the door is closed. In some embodiments, the door may scan the items at various times in order to inventory the contents of the cabinets. For example, the enclosure may scan periodically at random times or the cabinet may scan at set times. For example, in some embodiments, the door can be opened and a door open timer started. If a user then closes the door, a confirmation screen may appear with a confirmation timer. On the confirmation screen, the user may have the option of selecting a transaction complete or done identifier or functionality, or any other suitable mechanism for the user to indicate that the transaction is complete. Once the user has indicated that the transaction is complete a scan of the contents of the cabinet may be initiated. When a successful scan has occurred, a home screen may appear to indicate that the system is ready. In some embodiments, the scan may occur when a user authenticates prior to gaining entry to the enclosure.

The inventory management system may note products taken. In some embodiments, the enclosure only sends a delta of items taken or returned and tracks the inventory itself. In some embodiments, the enclosure sends a scan of all items in the enclosure and sends the inventory to a server where the inventory is managed remotely. In some embodiments, the enclosure sends a delta and the inventory is managed remotely. In some embodiments a list of all the items is sent to a remote server and compared to a master list to determine the delta.

In some instances, the user closes the door and a confirmation screen to confirm that the user is done with the transaction. In such an embodiment, the confirmation timer has been started at the showing of the confirmation screen and the confirmation timer and then expires. In such an embodiment, once the confirmation timer expires the home screen then appears. The systems then can go into a system idle state. Once the system idle state occurs a scan is initiated. In some embodiments, the display can show that the scanning is occurring so a user would know the enclosure was not currently available. In some embodiments, the confirmation timer may expire and a home screen may appear. However, the system idle state may not be initiated right away. In such an embodiment, a new user or a repeat user may attempt to authenticate with the system. The enclosure would then scan the contents of the enclosure.

Provided herein is a method of using an inventory management system. In some embodiments, a user may approach an enclosure as described herein. The user would then authenticate at the enclosure by any suitable mechanism. Once the user authenticates at the enclosure, where a lock is present on the enclosure, the door may unlock and the user may gain entry. Alternatively, the user may simply open the door once tracking of who is using the enclosure is complete. They user may then take an item from the interior of the enclosure. Regardless of whether an item is taken from the enclosure, at some time after the user has finished interacting with the enclosure, a cycle count of all the items in the enclosure may be performed. The enclosure may then determine which, if any items are missing, and update the stock inventory of the enclosure. At some scheduled interval a replenishment order may be sent to the administrator. In some embodiments, the stock orders may be filled as soon as they are received by the administrator. In some embodiments, the stock order is cached until such time that several replenishment orders may be consolidated and shipped together. Once the replenishment order is shipped and received by the local administrator, the local administrator may then restock the cabinet. The administrator may then authenticate at the enclosure using a badge or passcode. Alternatively the administrator may use a key to enter the enclosure. In some embodiments, the items placed into the cabinet are scanned with either an RFID reader or barcode reader as the items are placed in the enclosure. In some embodiments, the items are placed into the enclosure and then the enclosure determines which items are new to the cabinet. Once the correct inventory has been established, a stock update to the server may occur to accurately reflect the contents of the enclosure to a user.

In some embodiments, it may become apparent that one of the tags on an item in the enclosure is not functioning properly. For example, physical examination of the tag may reveal a missing or damaged tag. In such an embodiment, the administrator may identify a defective tag and then replace the tag with a new tag. Once the tag has been replaced, the administrator may enter the administrator mode of the cabinet. The administrator may then scan the new tag with any suitable mechanism including an RFID reader located in the cabinet, in proximity to the cabinet, or through a mobile scanner. In some embodiments, the administrator may scan the tag using the badge reader, if present. The system may then populate in the tag information into the inventory. Additionally, the administrator may enter in a SKU number, product description, or other product identifier to associate the tag with a product. The product and tag may then be transmitted to a storage database located remotely or locally.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

What is claimed is:

1. A self-locking door comprising:
   a door;
   a lock located on the door;
   a strike plate configured to engage the lock, wherein the strike plate controls the lock through a sensor; and
   a motion sensor configured to detect presence of a user proximal to the door and wherein the motion sensor controls the lock and locks the door if the user is not present;
   wherein the strike plate and the motion sensor both independently control the locking of the door.

2. The door of claim 1 comprising a computer configured to control unlocking of the door.

3. The door of claim 2 wherein the self-locking door is configured to operate independently of the computer controlled unlocking.

4. The door of claim 1 wherein the strike plate is a magnetic strike plate including a magnetic switch.

5. The door of claim 1 wherein the sensor is an ultrasonic sensor.

6. The door of claim 1 wherein the sensor is selected from at least one of an ultrasonic sensor, a motion sensor, a proximity sensor, a pressure sensitive mat, a light curtain, and radar.

7. The door of claim 1 wherein the lock is an electrically-actuated lock.

* * * * *